United States Patent [19]

Rysti

[11] 4,219,120

[45] Aug. 26, 1980

[54] METHOD AND APPARATUS FOR HANDLING BOTH GREEN AND DRIED TIMBER LENGTHS

[76] Inventor: Alpo Rysti, Frisansintie 22, 02240 Espoo 24, Finland

[21] Appl. No.: 867,155

[22] Filed: Jan. 5, 1978

[30] Foreign Application Priority Data

Aug. 11, 1977 [FI] Finland .................................. 772422
Nov. 1, 1977 [FI] Finland .................................. 773269

[51] Int. Cl.$^2$ ........................ B65G 47/19; B65G 57/06

[52] U.S. Cl. .................................... 209/521; 144/312; 198/452; 414/41; 414/49; 414/51; 414/77; 414/271; 414/786; 414/267

[58] Field of Search .................. 214/6 DK, 6 M, 6 H, 214/16 B, 152; 209/517-521, 933; 198/370, 447, 452; 144/312; 414/51, 41, 42, 49, 77, 267, 269, 271, 277, 285, 786

[56] References Cited

U.S. PATENT DOCUMENTS

| | | | |
|---|---|---|---|
| 1,349,836 | 8/1920 | Johanson | 209/520 |
| 3,085,686 | 4/1963 | Hanbury | 209/520 |
| 3,116,835 | 1/1964 | Brandon | 214/6 H X |
| 3,823,834 | 7/1974 | Rysti | 214/6 DK |
| 4,081,088 | 3/1978 | Rysti | 214/6 M |

FOREIGN PATENT DOCUMENTS

| | | | |
|---|---|---|---|
| 797635 | 10/1968 | Canada | 209/518 |
| 397444 | 2/1974 | U.S.S.R. | 209/518 |

*Primary Examiner*—L. J. Paperner
*Attorney, Agent, or Firm*—Steinberg & Blake

[57] ABSTRACT

A method and apparatus for handling lengths of timber which are both green and dried include the feature of simultaneously conveying, by way of suitable conveyors, both the green timber and the dried timber to a given location from where the two different types of timber are conveyed together by way of a single conveyor beyond the given location to a drop sorter having compartments into which the green and dried timber are dropped according to a given program. From the drop sorter batches of green timber and batches of dried timber are received by batch conveyors which serve to convey these batches to a packaging apparatus which serve to provide from the batches of green timber packages in which layers of green timber are separated by spacers, preparatory to transmitting these packages to a drying installation, while the dried timber batches are formed into packages which are suitable for further handling. The packaging apparatus may include separate machines for the green timber and dried timber, or a single unitary packaging machine may be provided, according to a further feature of the invention, for alternately operating on the green timber and dried timber to provide therefrom packages as referred to above.

10 Claims, 8 Drawing Figures

METHOD AND APPARATUS FOR HANDLING BOTH GREEN AND DRIED TIMBER LENGTHS

BACKGROUND OF THE INVENTION

The present invention relates to methods and apparatus for handling both green timber and dried timber simultaneously.

As is well known, in the handling of timber lengths in a sawmill or the like, it is necessary to carry out operations such as sorting and trimming, drop-sorting by quality or size, and packaging of lengths of timber both in a green condition as well as in a dried condition.

During the development of the sawmill industry, a problem has come up in connection with how to mechanize the handling of sawed lengths of timber in sawmills which are of a small or medium size. The number of such sawmills, particularly in countries such as Finland and in the Scandinavian countries, is many times the number of large sawmills, but on the other hand experience has shown that it is prohibitively expensive for a medium sized sawmill to purchase every type of modern sawmill machinery which generally require separate machines and buildings therefor. These considerations are particularly true in the case of drop sorters, which are required in the sorting both of dried timber and green timber.

There are known machines and methods according to which the same machines may at different times be utilized to perform different operations, such as packaging of dry timber and packaging of green timber for kiln drying. In this connection reference may be made to Finnish Pat. No. 35,523.

However, all known prior art expedients have proved to be unable to provide a satisfactory solution as to the above problem, at least in connection with medium sized sawmills, where it is necessary to be able to perform simultaneously all of the operations in connection with dry as well as green timber lengths, so the problems of intermediate storage and the inconvenience resulting from different work shifts may be avoided.

Although, in theory, the number of pieces of sawed timber lengths to be processed in a sawmill is the same for green timber as well as for dried timber, experience has shown that in practice this is not true. Thus, the green timber lengths contain rejects which are partly eliminated prior to the drying process and additional pieces are lost due to damage thereof. Moreover, when handling timber of large dimensions, the sorting operations are slow, and this latter factor must be taken into consideration if it is desired to carry out sorting of the green and dried timber simultaneously.

It is necessary for such simultaneous operations to take into consideration both the capacity and the reliability in service of machines as well as human factors which may retard certain operations.

SUMMARY OF THE INVENTION

It is accordingly a primary object of the present invention to provide a method and apparatus which will avoid the above drawbacks while solving the above problem.

Thus, it is the object of the present invention to provide a method of operation according to which it becomes possible to handle both green and dried timber simultaneously when carrying out operations such as sorting lengths of green and dried timber.

One of the objects of the present invention is to provide a single drop-sorting installation which can be used both for green timber and dried timber as well as for providing for effective transporting of batches of green and dried timber received from the drop-sorter.

The present invention is based in part on the realization that only one operation which is identical for green as well as dried timber lengths is required for carrying out the drop-sorting thereof. Furthermore, experience has shown that it is possible to achieve an extremely high output capacity from a drop-sorting operation, with the operations performed thereby not being affected by human factors inasmuch as the operation is completely mechanized. Thus, with the present invention there is provided a drop-sorter and conveyor associated therewith which have a capacity great enough to be capable of simultaneously performing sorting operations, of any desired type, both in connection with green lengths of timber and dried lengths of timber, in a manner suitable for a small or medium sized sawmill.

While the green and dried lengths of timber are initially separately conveyed, the speed provided for the drop-sorter is arranged so as to be at least twice the capacity of the green timber conveyor, or the dry timber conveyor. If the capacity of the drop-sorter is lower, then the scoops or hooks which convey lengths of timber to the drop-sorter will run empty.

In addition, with the invention the locations where timber is dropped into the drop-sorter are provided in a specific number both for the dried timber as well as for the green timber. Increasing or decreasing the number of dropping locations is undertaken as necessity arises, conforming to a program which is made up in advance.

As a primary example of one possible operation schedule, the following may be considered. The quantity of green timber which arrives at a given time is a maximum of 60 pieces per minute, while that of dried timber is 50 pieces per minute. In this event the speed of the drop-sorter is such that it can handle not less than 120 pieces per minute. The packaging of dried timber will then proceed at an average rate of 50 pieces per minute, while the packaging of green timber will proceed at an average rate of 60 pieces per minute. This ratio may be even higher, or vice-versa.

In any event, the capacities referred to above will suffice for the production of medium sized sawmills. As an investment, the method and apparatus of the invention are highly favorable, and all operations carried out require only a relatively concentrated area. It is furthermore an advantage of the invention that stopping operation at one conveying line will not necessitate stopping the operation at another conveying line.

During the course of development and mechanization of the sawmill industry, the small-scale sawmill industry has encountered difficulties because those machines which are nowadays required in the handling of timber are exceedingly expensive. This factor is particularly true for compartment sorters for sawed lengths of timber, for spacer stick inserting machines, and for packaging machines.

An advantageous embodiment of the invention which is appropriate particularly for small sawmills includes the feature of conveying batches both of green and dried timber, following sorting thereof, to a unitary packaging machine which is capable of packaging the green timber in such a way that spacer sticks are situated between layers thereof, so that these green timber packages are then suitable for delivery to a drying installation, with this same machine also being capable of operating in such a way that it can provide packages from the batches of dried timber.

With this latter embodiment which is particularly appropriate for small sawmills, beneath the drop-sorter there are a pair of batch conveyors for respectively conveying both batches of green timber and batches of dried timber to a location between these conveyors. At this location between the conveyors there is a transporting means which serves to transport either batches of green timber or batches of dried timber to the unitary packaging machine which then operates on the batches as referred to above.

Operations of the above type are rendered possible by the fact that some batches of green timber are stored on a conveyor beneath the drop-sorter with batches of dried timber also being stored. When a sufficient number of batches of green timber or dried timber have accumulated, these batches are successively conveyed to the unitary packaging machine referred to above by way of the above transporting means which can take the form of a belt conveyor, a set of rollers, a crane, a transfer carriage, or the like.

By way of the above structure and method of the invention, there is a primary advantage in that the green and dried lengths of timber may be sorted with the same drop sorter simultaneously while the unitary packaging machine which can consecutively process green packages, providing the latter with spacer sticks, and which can also consecutively process packages of dried timber enables the extent to which time is wasted to be considerably reduced due to the programming of the unitary packaging machine.

In accordance with the invention a method for handling the lengths of timber, which are both green and dried, includes the steps of conveying both the green timber lengths and the dried timber lengths simultaneously to a given location from which both the green and dried timber lengths are conveyed together along a common path beyond the latter given location. These latter green and dried timber lengths are then delivered from their common path of travel to a sorting apparatus where the green timber lengths and the dried timber lengths are both sorted.

With the apparatus of the invention, a green timber conveying means and a dried timber conveying means both are provided for conveying lengths of green timber and lengths of dried timber to a given location where both types of timber are received by a common conveying means for conveying both the green and dried lengths of timber along a common path from where they are dropped into compartments of a drop-sorting means.

BRIEF DESCRIPTION OF DRAWINGS

The invention is illustrated by way of example in the accompanying drawings which form part of this application and in which.

DESCRIPTION OF PREFERRED EMBODIMENTS

Figure 1A:
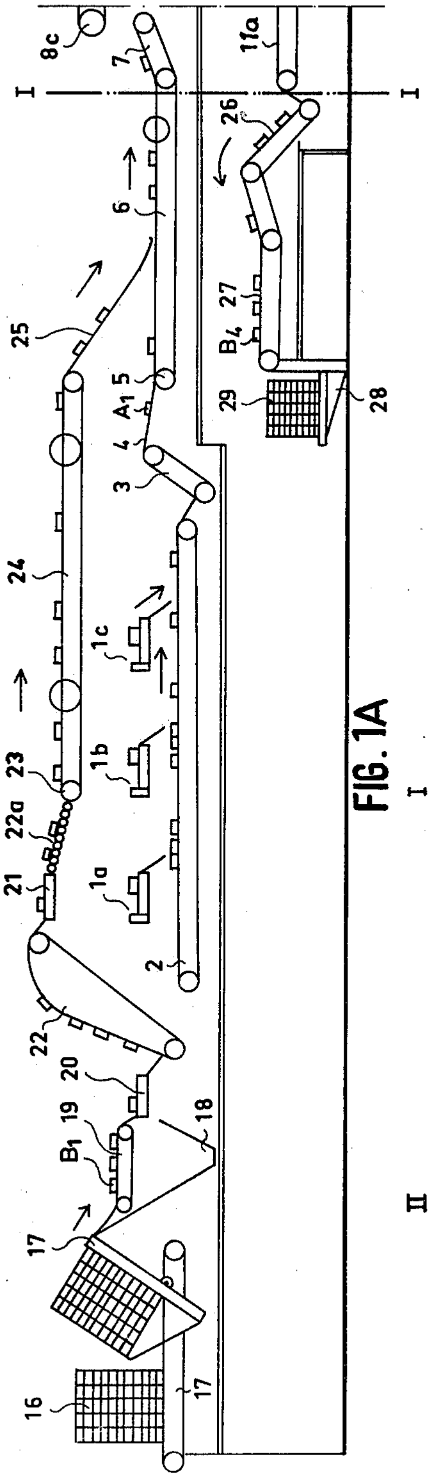
FIGS. 1A and 1B illustrate in a schematic side elevation one possible embodiment of an apparatus of the invention for carrying out the method of the invention, FIG. 1B being a continuation of FIG. 1A extending from line I—I of FIG. 1A.
Figure 3A:
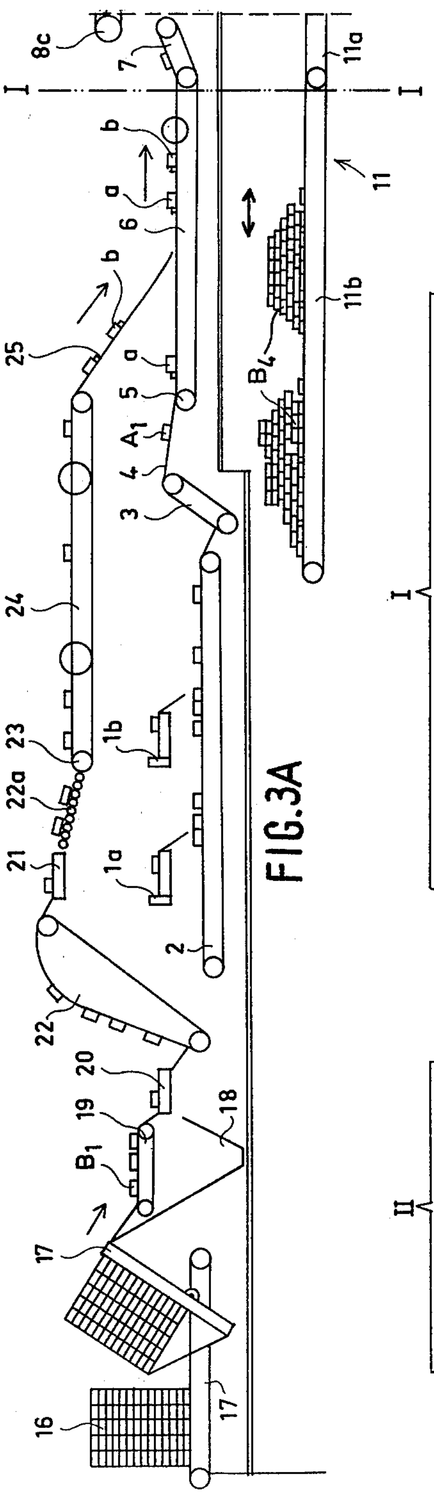
FIGS. 3A and 3B show in a schematic side elevation another embodiment of an apparatus of the invention for carrying out a method of the invention, FIGS. 3A and 3B being continuations of each other from line I—I appearing in FIGS. 3A and 3B.

Referring to FIGS. 1A and 3A, lengths of green timber which have not yet been dried arrive from the sawmill along longitudinal conveyors from where these lengths of green timber are delivered to a green timber conveying means 2. Thus, in FIG. 1A there are shown three conveyors 1*a*, 1*b*, 1*c*, which deliver the lengths of green timber to the conveying means 2, which may take the form of a suitable belt or series of sprocket chains guided around suitable pulleys or sprocket wheels. The conveyors 1*a*, 1*b*, 1*c*, convey the lengths of green timber perpendicularly with respect to the plane of FIG. 1A, the lengths of timber being arranged longitudinally on these conveyors so that the lengths of timber travel in the direction of their length, and at the ends of the conveyors 1*a*–1*c* which are situated over the conveyor 2, a suitable inclined guide is provided to engage the successive lengths of timber and deflect them to the right, as viewed in FIG. 1A, so that the successive lengths of timber fall down a suitable incline onto the conveyor 2. The same arrangement is provided in FIG. 3A except that in this case there are only two longitudinal conveyors 1*a*, 1*b*. The lengths of green timber are delivered by the conveyor means 2 to a lift-type of distributing conveyor 3 which in a known way receives the successive lengths of green timber and elevates them up to an inclined set of rollers 4 down which the lengths of green timber are guided by gravity over the freely turnable rollers of the conveyor 4, forming at this time a layer $A_1$ of the lengths of green timber. Thus, the units 2–4 form a conveying means for conveying the green timber to a conveying means 6 which is a common conveying means for both green and dried timber, as will be apparent from the description below. The common conveying means 6 has a series of consecutive carrier portions for carrying lengths of timber, and at the place where the set of rollers 4 join the conveying means 6, a dosing or metering means 5 is provided for delivering the lengths of green timber to every second carrier portion of the conveyor 6 so that in this way spaces will be provided between the successive lengths of green timber carried by the common conveying means 6. The common conveying means 6 includes an upwardly extending conveyor portion 7 as well as a drop conveyor 8 which has a series of hook-shaped supports 8*a* shown schematically in FIGS. 1B and 3B, and in a known way the lengths of timber carried by the upwardly extending conveyor portion 7 are delivered to the hook-shaped supports 8*a* of the drop conveyor 8.

From the conveyor 8 of the common conveying means the lengths of timber are dropped according to a predetermined program in a known manner into predetermined compartments 9 of a drop-sorting means. The delivery of the lengths of green timber by the conveyor portion 7 to the hook-shaped supports 8*a* is such that every other hook-shaped support 8*a* receives a length of green timber.

Figure 1B:
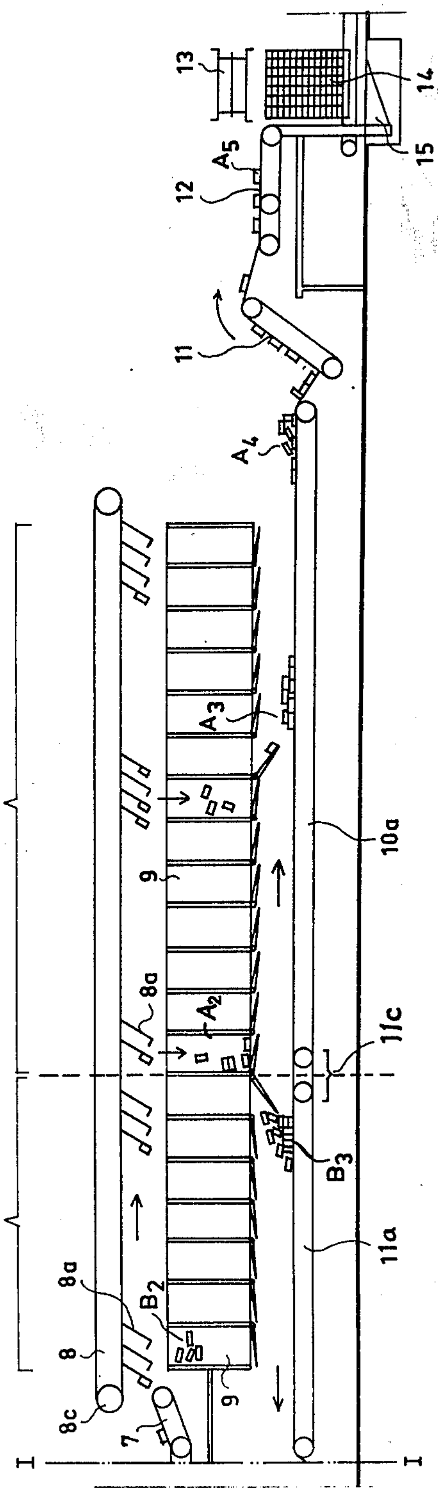
Figure 3B:
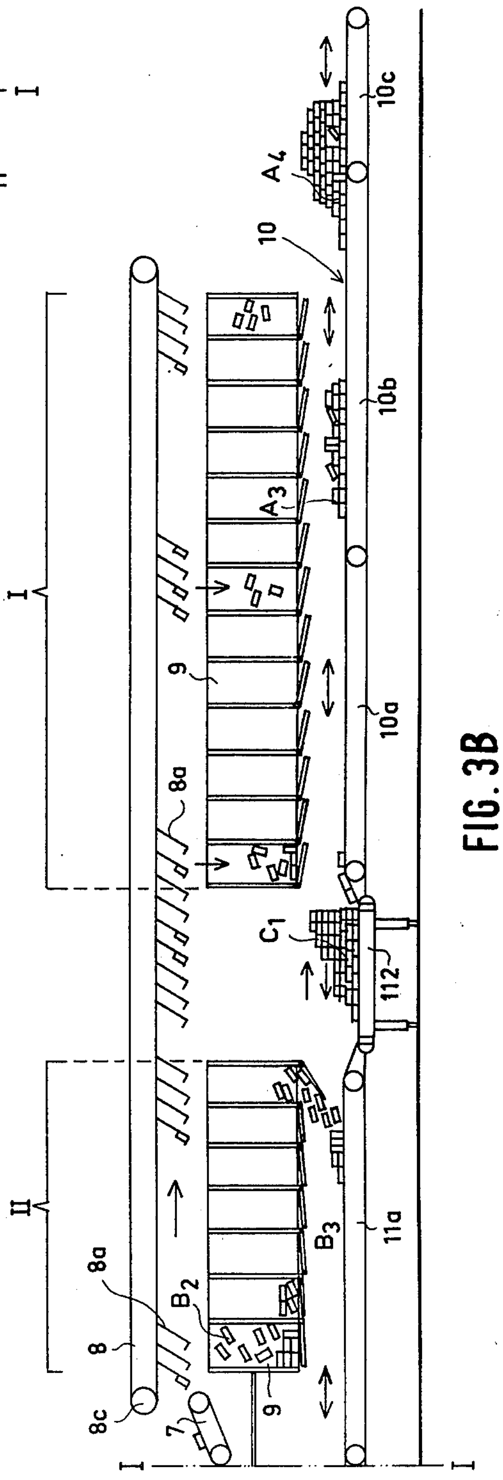

The drop-sorting means which is provided with the compartments 9 is divided into a pair of sections I and II which are indicated in FIGS. 1B and 3B beneath corresponding portions of the conveyor 8. The section I of the drop-sorting means includes a group of compartments 9 situated one next to the other and receiving according to a predetermined program only lengths of green timber which are received according to their quality and dimensions in certain ones of the compartments 9 of section I in a known way. A given compartment 9 of section I which becomes filled with a batch $A_2$ of lengths of green timber will then be automatically emptied, by lowering the bottom door thereof, so as to provide in this way a batch of green timber $A_3$ on a batch conveyor means situated beneath the drop-sorting means, and in the example of FIGS. 1B and 3B, the batch conveyor means includes at least one batch conveyor 10*a* situated beneath section I of the drop-sorting means. It will be seen that in the example of FIG. 3B, the batch-conveying means includes three successive conveyors 10*a*, 10*b*, 10*c* which have overlapping end regions and which can be operated in either one of a pair of opposed directions. These conveyors 10*a*–10*c* of FIG. 3B take the form of endless chains guided around suitable sprockets, with the chains of conveyor 10*b* being out of line with the chains of the conveyors 10*a* and 10*c* while extending around sprockets which are coaxial with those of the chains of the conveyors 10*a* and 10*c*, so that in this way the series of three conveyors can actually operate as a single elongated conveyor.

In the case of FIG. 1B, the batch conveyor 10*a* has received a batch $A_3$ of green timber and is shown delivering a further batch $A_4$ of green timber to a lifting conveyor 11 which delivers the green timber in a single layer to a suitable conveyor 12 which forms a single layer $A_5$ of the lengths of green timber.

The packaging apparatus of FIGS. 1A, 1B includes a green timber packaging machine provided in a known way with a lift 15 which is schematically illustrated to have formed thereon successive layers of green timber. However, this machine includes a distributor 13 for distributing spacer sticks in a known way onto a previously deposited layer of green timber. Thus, in this way there will be provided on the lift 15 a package 14 of green timber in which layers of timber are separated from each other by spacer sticks so that this package is then in a condition to be transported to a drying kiln.

Figure 2:
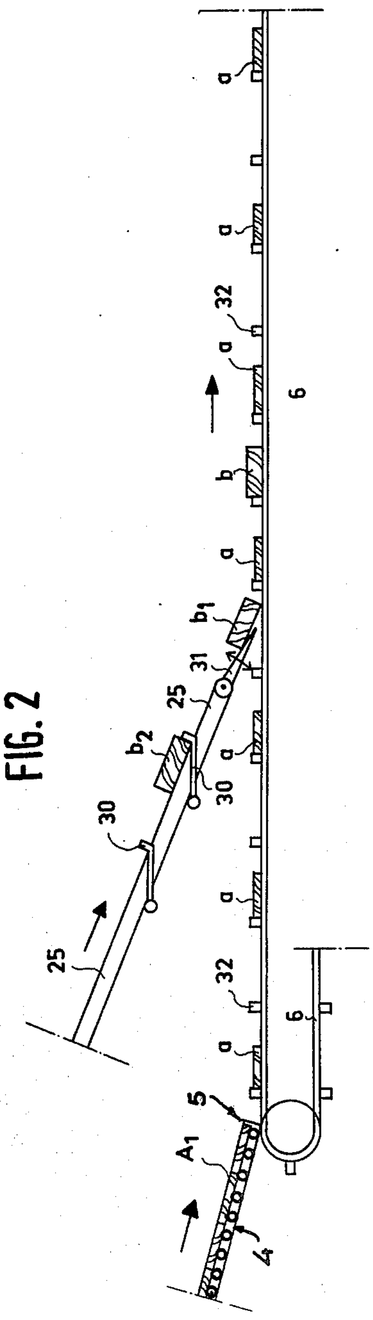
FIG. 2 is a fragmentary schematic side elevation showing details at the region where a pair of conveyors for green and dried timber, respectively, join a common conveyor for both types of timber.

FIG. 2 illustrates in greater detail how green and dried lengths of timber are delivered to the common conveyor means 6. Thus, as is shown in FIG. 2, from the layer $A_1$ of lengths of green timber on the rollers 4 the lengths of green timber are distributed to every second carrier portion of the conveyor 6, the carrier portions thereof being separated by the members 32 of the conveyor 6.

Figure 2A:
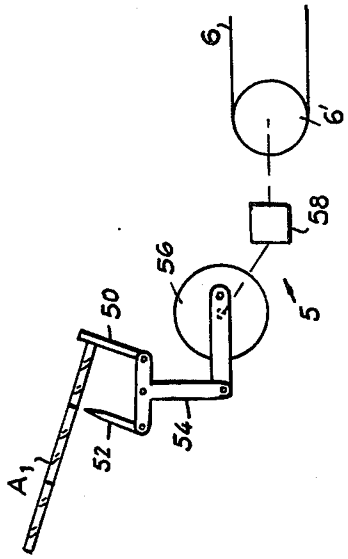
FIG. 2A schematically shows one possible embodiment of a structure for metering timber delivered from one conveyor to another.

The metering or dosing means 5 can take many different forms. As is schematically shown in FIG. 2A, while the layer $A_1$ is held back by a member 50, a member 52 is situated beneath the boundary line between the first two lengths of timber, these members 50 and 52 being guided for up and down movement and being pivotally connected to opposed ends of a swingable T-shaped member 54 which is operated from a rotary crank means 56. This latter means is driven by a suitable transmission 58 from the shaft which drives the sprocket wheels 6' of the conveyor 6. Thus the operation of elements 50 and 52 is synchronized with the operation of the conveyor 6, this operation being such that when member 50 is lowered to release the next length of green timber to be delivered to the conveyor 6, the member 52 is raised to hold back the succeeding lengths of green timber, and then during the continued turning of the crank 56 the parts again resume the position shown in FIG. 2. This speed of operation of the dosing means 5 is such that every second space between members 32 on conveyor 6 will receive a length of green timber a as indicated in FIG. 2.

As is shown in FIG. 2, above the portion of the conveyor 6 which initially receives the lengths of green timber a there is an inclined support 25 having an upper surface down which lengths of dried timber can freely slide by gravity, these lengths of dried timber being releasably held by elements 30 which are controlled in a known way to release the lengths of dried timber. Thus a length of dried timber $b_2$ is shown being held by one element 30 while a length of dried timber $b_1$ is shown in a condition where it is delivered to a space between a pair of lengths of green timber a, and there is shown on the conveyor 6 a length of green timber b which has already been delivered thereto. The bottom end of the inclined support 25 pivotally carries a member 31 which is capable of swinging up and down in response to being engaged by the members 32 and which smoothly delivers the successive lengths of dried timber into the spaces between the lengths of green timber. The several stopping elements 30 are operated in a known way according to a predetermined program so as to release the lengths of dried timber to achieve the above distribution of green and dried timber on the common conveyor means 6. The freely turnable guides 31 serve to provide a smooth transfer of the lengths of dried timber, without bouncing thereof, onto the conveyor means 6.

The details with respect to handling of the green timber may vary widely. For example, the apparatus for carrying out the method of the invention may include an installation separate from the sawmill, in which case the green timber conveying means is supplied from a suitable truck or crane. With some embodiments of the invention the green timber may arrive from the sawmill through a so-called magazine feed, according to which the pieces of green timber will fall directly onto the conveyor 6 into the proper spaces. The conveyor means 6 may be appropriately provided with automatic breadth and thickness measuring means, which are not illustrated, and which in a programmed manner guide the pieces to the correct dropping points at the compartments 9, the lengths of timber being conveyed to the dropping points by the conveyor portion 8 of the common conveyor means 6. It is also possible to carry out at the conveyor means 6 cross-cutting and sorting, if required, and various requisite ancillary means, such as pulling means, turning means, cross-cut saws, and the like may be provided at the common conveyor means.

FIGS. 1A and 3A illustrate how the dried timber is handled preliminarily to reaching the common conveyor means 6–8. Thus, packages of dried timber 16 are delivered onto a package-conveyor 17 by means of a suitable truck or crane, for example. This package 16 is then taken apart, layer by layer, with the aid of a tilting lift 17. The package 16 is in the condition in which it is received from the drying kiln, so that layers of dried timber are separated by spacer sticks, and the arrangement is such that the spacer sticks will be separately received by a conveyor 18 which returns them to the distributor 13 shown in FIG. 1B so that they may be reused.

The successive layers of dried timber are received by a conveyor 19 on which the dried timber forms a layer $B_1$. The lengths of dried timber are fed onto a roller type of conveyor 20 from the conveyor 19, with a device being provided for aligning ends of the lengths of dried timber. A lift-type of conveyor 22 receives the lengths of dried timber from the conveyor 20 and delivers the lengths of dried timber to a second roller-type of conveyor 21 from where they are delivered to a roller-type of conveyor 22*a* down which the lengths of dried timber travel by gravity to be received at a metering unit 23 which meters the successive pieces of dried timber onto a conveyor 24 in the form of a sorting table.

This sorting table 24 may be of any type known in itself and conforming to previously known principles of operation with sorting being carried out in a conventional manner on the table 24 so that the lengths of timber are arranged according to different timber qualities. Usually in connection with the sorting table there are pulling means, turning means, carry-over rollers, cross-cutting saws or multi-blade saws or trimmers (not shown). In certain cases at this stage a quality stamp is also applied to the timber.

At the table 24 each length of dried timber is given its designated destination at the drop-sorting means, and this designated destination accompanies each length of dried timber until it is dropped into a predetermined compartment of the drop-sorting means. Thus, the successive lengths of dried timber reach the inclined support 25 down which they slide in the manner described above so that they are guided into the spaces between the lengths of green timber and then the successive lengths of timber are delivered to the successive hook-shaped supports 8*a* of the drop-conveyor 8, so that in this way the successive lengths of green and dried timber are situated on successive hook-shaped supports 8*a* with every second support 8*a* carrying a length of green timber while between the latter the supports 8*a* carry lengths of dried timber.

The top cross-cutting may also be advantageously carried out on the conveyor 6, together with simultaneous handling of the green timber.

With the examples of the invention described above and shown in the drawings, the section II of the drop-sorting means as well as the part of the drop conveyor 8 situated thereover is reserved for dried lengths of timber which have already been previously sorted at the table 24 as pointed out above. Thus, the dried lengths of timber will be directed to predetermined dropping locations in accordance with a program which is stored at the sorting table 24. FIG. 3B shows one of the compartments 9 of section II of the sorting means becoming filled with a batch $B_2$ of dried lengths of timber, while a previously accumulated batch $B_3$ is being emptied onto the illustrated batch conveyor 11*a*. In FIG. 1B there is also shown a batch $B_2$ of dried timber being filled in one compartment while a previously completed batch $B_3$ has been received on the batch conveyor 11*a*. In the case of FIG. 1B, the completed batch $B_3$ of dried lengths of timber is transported by the conveyor 11*a* to the distributor lifting conveyor 26 which then delivers the dried lengths of timber in the form of a layer $B_4$ to the packaging machine 27. This packaging machine is often provided with recording and stamping means, and also has, as illustrated, a lift 28 on which a package 29 of dried timber is assembled. This package 29 is then transported usually in its longitudinal direction, from a roller track to a lashing installation, and then the package is further transported. The manner of handling may be different for the dried timber, within the general concept of the invention. The components 17–23 at the part of the apparatus which initially handles the dried timber may consist of any type of apparatus employed in package-disbursing systems which are already known.

The green and dried timber supply lines may be reversed with respect to each other, so that instead of the conveyor means for the green timber being situated beneath the conveyor means for the dried timber, the means which conveys the lengths of dried timber can be situated beneath the means which conveys the lengths of green timber. Also, it is possible for these conveying means which are respectively provided for the green and dried lengths of timber to be situated beside each other, in a manner which is set forth in greater detail in connection with FIG. 5, and in this latter event one of the types of timber is fed longitudinally onto the common conveying means 6.

The sequential arrangement of the sections I and II of the drop-sorting means and the relationship between the capacities thereof may also be varied, as necessity arises, inasmuch as it is possible, for example with the arrangement of FIGS. 1A, 1B to make packages both of green and dried timber with the separate packaging machines. The batch conveyors 10*a*, 11*a* of FIG. 1B may be operated in either one of a pair of opposite directions. Such an operation may be carried out, if required in order to provide for a temporary, intermediate storage for the dried or green timber. Thus it will be seen that the conveyors 10*a* and 11*a* of FIG. 1B overlap each other at their adjoining end regions, this being brought about by providing these conveyors in the form of sprocket chains which are out of line with each other, so that there is a common overlapping portion 11*c* for these conveyors. Thus with this arrangement by properly selecting the direction of operation of the conveyors it is possible, for example, to store a batch of green timber beneath section II of the drop sorter which is provided for the dried timber, and in the same way it is possible to store a batch of dried timber beneath the section I provided for the green timber. Thus because of the overlapping portion 11*c* of these conveyors it is possible to provide for transferring of timber batches from one conveyor to the other.

As was pointed out above, there is shown in FIG. 3B, beneath the section I of the drop sorter, the successive overlapping conveyor portions 10*a*, 10*b*, 10*c* which can be operated in either direction. In the embodiment of FIGS. 3A, 3B the conveyor 11*a* beneath the section II of the drop sorter overlaps a conveyor 11*b*, and both of these conveyors 11*a*, 11*b* may be operated in either direction, so that in the case of both sets of conveyors it is possible to bring about storage of a given number of batches of green or dried timber received from the drop-sorting means, and in this way it is possible to accumulate either on batch conveyor means 10*a*–10*c* a number of batches of green timber ready to be packaged and/or on the conveyors 11*a*, 11*b* which form a batch-conveyor means for the dried lengths of timber a given number of completed batches of dried timber ready to be packaged. Thus FIG. 3A shows two such batches $B_4$ on the conveyor 11*b*, stored thereon ready to be packaged as required.

Figure 4:
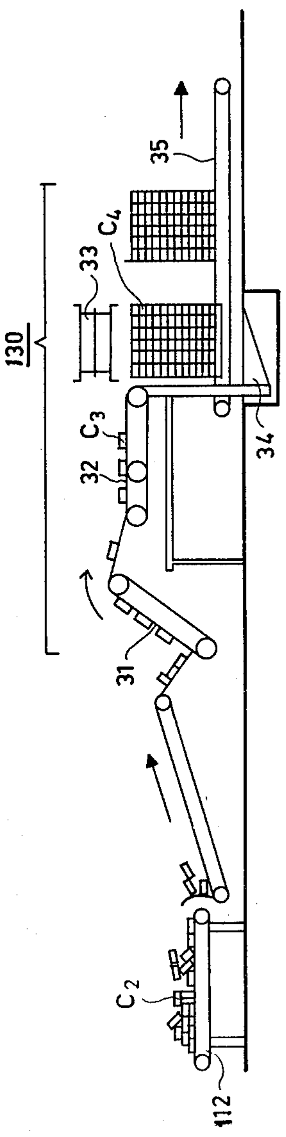
FIG. 4 is a schematic side elevation of a unitary packaging machine used with the embodiment of FIGS. 3A, 3B, FIG. 4 showing also a transporting means which delivers timber to the packaging machine.
Figure 5:
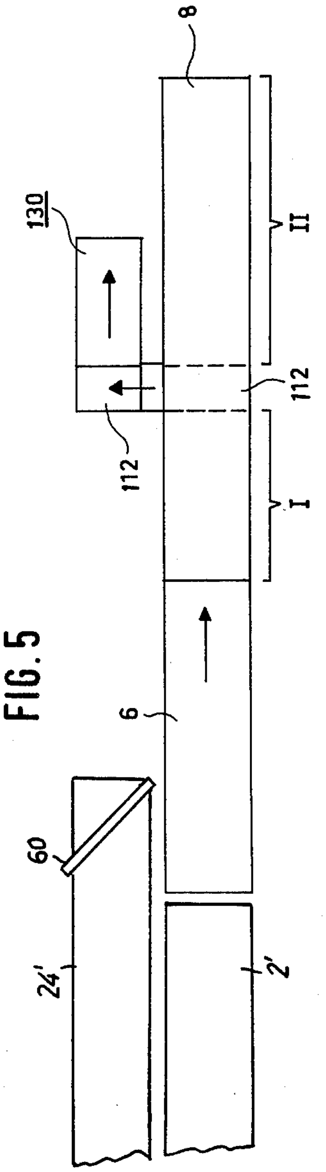
FIG. 5 is a schematic plan view of the method and apparatus of FIGS. 3A, 3B with FIG. 5 also showing schematically another embodiment of conveyors for delivering both green lengths of timber and dried lengths of timber to a common conveying means.

With the embodiment of FIG. 3B, parts of which are also illustrated in FIGS. 4 and 5, the sections I and II of the drop sorter are spaced from each other, and the same is true of the pair of batch-conveying means situated therebeneath. In the space between the conveyors 10*a* and 11*a* there is a transporting means 112 capable of receiving either batches of dried timber or batches of green timber and cooperating with a unitary packaging machine 130 which forms the packaging means of this embodiment. This unitary packaging machine 130 thus has with respect to the transporting means 112 the relationship according to which this transporting means will transport both batches of green timber and batches of dried timber to the unitary packaging machine 130.

Referring to FIG. 4, it will be seen that the unitary packaging machine 130 includes a lift-type of conveyor 31 which after receiving the timber from the transporting means 112 delivers this timber to a conveyor 32 which then delivers the timber in the form of a layer $C_3$ to the lift 34 on which the illustrated package $C_4$ has been formed, with a completed package being transported away from the lift 34 by the conveyor 35 as shown schematically in FIG. 4. The unitary machine which is capable of forming either packages of dried timber or packages of green timber which have layers of green timber separated by spacer sticks is in itself known and includes in addition to the lift 34 the distributing apparatus 33 which in a known way can deposit spacer sticks on a previously deposited layer of green timber. Thus the conveyor 35 can carry away from the lift 34 not only packages of green timber which are to be delivered to a drying kiln but also completed packages of dried timber which can be transported to any desired location as set forth above. The transporting means 112 may take a number of different forms. For example the transporting or transfer means 112 may be in the form of a transfer carriage which travels along suitable tracks, or it may take the form of a crane, a roller track, or any other equivalent transferring or transporting means which in itself is known in the art.

While the transporting means 112 is shown in FIG. 4 in line with the components of the unitary packaging machine 130, it is to be understood that this is only a schematic illustration. The actual arrangement conforms to what is shown schematically in FIG. 5. Thus, FIG. 5 schematically illustrates how the common conveying means 6 delivers the alternating lengths of green and dried timber to the drop conveyor 8 which then drops these lengths according to a predetermined program into the sections I and II of the drop-sorter as described above. In the space between the batch conveyors there is the transporting means 112 which receives the completed batches either of dried timber or green timber in a manner apparent from FIG. 3B, and this transporting means 112 transports these batches in a direction transverse to the direction of travel of the batches provided by the batch conveyors. Thus FIG. 5 illustrates how the transporting means 112 transports the batches perpendicularly with respect to the path of travel of the batch conveyors. This transporting means 112 also extends perpendicularly with respect to the in-line arrangement of the components of the machine 130 so that when the transporting means 112 delivers the batches to a conveyor which delivers the timber in a layer to the lift-type of conveyor 31, the lengths of timber will be properly oriented.

FIG. 5 also schematically illustrates how it is possible to arrange the conveying means 2' for the lengths of green timber beside the conveying means 24' for the lengths of dried timber. Thus both of these separate conveying means are arranged in side-by-side relationship, as shown schematically in FIG. 5. The conveying means 2' will in this case deliver the lengths of timber to every other supporting portion of the conveyor 6 in the manner described above in connection with FIG. 2. However, the conveying means 24' is situated not only beside the conveying means 2' but extends beyond the latter to overlap the portion of the common conveying means 6 which initially receives the lengths of green timber. Situated over the end region of the conveying means 24' which partially overlaps the common conveying means 6 is an inclined deflecting bar 60 which engages the ends of the lengths of dried timber as they reach the common conveying means 6, and deflects the lengths of dried timber longitudinally so that they become situated on the conveyor 6. The speed of the conveyor 24' is of course synchronized with the speed of the conveyor 6 as well as with the speed of the conveyor 2', and the sychoonization is such that the successive lengths of dried timber will become situated respectively in the spaces between the successive lengths of green timber on the conveyor 6 with each length of dried timber being properly situated on the conveyor 6 by the time each length of dried timber has travelled beyond the deflecting bar 60.

With the embodiment shown in FIGS. 3A, 3B, as well as FIGS. 4 and 5, the batch conveyors can be used for intermediate storage of batches received from the drop sorter, as pointed out above. Thus on these batch conveyors there will be stored a given quantity of batches $A_3$, $A_4$ of green timber as well as a given quantity of batches $B_3$, $B_4$ of dried timber. As soon as a predetermined number of these batches have accumulated on one or the other of the batch conveyors, this particular conveyor will be started and the previously collected batches either of green timber or dried timber are consecutively delivered to the transporting means 112 which then delivers these batches successively to the unitary packaging machine 130. Thus the arrangement is such that a number of batches of dried timber will be successively delivered to the machine 130 and thereafter a number of batches of green timber will be delivered to the machine 130. Thus FIG. 3B shows a completed batch $C_1$ in the process of being transported by way of the transporting means 112 which serves to transport all of the batches of timber to the unitary machine 130.

As is indicated in FIG. 4, a batch $C_2$ of timber is in the process of passing from the transfer or transporting means 112 over to the machine 130 where there is shown a layer of timber $C_3$ being formed into the package $C_4$, according to methods and means known in themselves. After a given quantity of dried timber batches, for example, have been collected on the batch-conveyor means 11*a*, 11*b* and have then been transferred by the transporting means 112 to the machine 130, which thus operates at this time to form packages of dried timber, the next operating phase is started according to which the machine 130 is programmed to operate to form packages of green timber, the spacer sticks being inserted between the layers of green timber with this operation, as set forth above. These operations will of course be carried out on the green timber batches $A_3$, $A_4$ which have been temporarily stored on the batch conveying means 10*a*–10*c*. The operations will then continue in the same way in that the machine 130 will be used periodically to form a given number of packages of dried timber and then a given number of packages of green timber.

With respect to the various details of the structure of the invention and the method thereof, it is, for example, possible to utilize at the drop sections I and II the teachings of Finnish Pat. No. 46,246. The drop sorter 8 may appropriately consist, for example, of a high capacity conveyor according to Finnish Pat. No. 44,783. The drop sorter with its compartments, lifts, or carriages may be of any known type. On the conveyors 6 and 24, the pulling conveyors according to Finnish Pat. Nos. 41,817 and 43,968 are appropriate for pulling the timber into cross-cutting position. With a view to facilitating the sorting operation, the method of the Finnish Pat. No. 46,598 may be utilized with advantage on the conveyors. In the packaging and spacer-stick inserting operations, the apparatus according to Finnish Pat. Nos. 42186, 46247, 42188 and 43366, for example, may be utilized. There are several ways in which to meter or dose the timber lengths such as those shown in Finnish Pat. Nos. 48,569 and 43,564, for example.

Thus, the invention is not to be narrowly confined to the details presented above and shown in the drawings only by way of example, inasmuch as these details may vary within the scope of the inventive concept defined by the claims which follow.

What is claimed is:

1. In a method for handling lengths of timber which are both green and dried, the steps of conveying both the green timber lengths and dried timber lengths simultaneously along separate respective paths to a given location, conveying the green and dried timber lengths beyond said given location at least in part along a common path with a conveyor having hook-shaped supports for the timber lengths, which conveyor travels over a drop sorter having compartments into which the lengths of timber are dropped from the hook-shaped supports, arranging the green timber lengths and dried timber lengths alternately on successive ones of the hook-shaped supports which travel over the compartments of the drop sorter, dropping green timber lengths from the hook-shaped supports into predetermined compartments of the drop sorter and also dropping dried timber lengths from the hook-shaped supports into other predetermined compartments of the drop sorter, so that any given compartment of the drop sorter will receive only one type of timber length, namely either green timber lengths of dried timber lengths, delivering the green lengths of timber and the dried lengths of timber from the drop sorter to a batch conveyor for conveying batches of sorted green timber and batches of sorted dried timber, and conveying said batches by way of said batch conveyor to a packaging apparatus including a single, unitary, packaging machine, said packaging apparatus being operated alternately to form from each batch of green timber a green timber package in which layers of green timber are separated by spacers, preparatory to being delivered to a drying unit, while forming at said apparatus from the dried timber batches packages of dried timber which are suitable for further handling and wherein the drop sorter includes one group of compartments for green timber lengths and a second group of compartments for the dried timber lengths while said batch conveyor includes separate conveyors respectively situated beneath said groups for separately conveying the batches of green timber and the batches of dried timber, and including the step of conveying said batches to a location situated between the separate batch conveyors and said groups and then transporting the batches from said latter location along a common path to said packaging machine.

2. In a method as recited in claim 1 and including the step of preliminarily storing on the batch conveyor beneath said one group of compartments a number of batches of green timber and preliminarily storing on the batch conveyor beneath said second group of compartments a given number of batches of dried timber, and then transporting one of said number of stored batches one after the other to said machine to be formed into packages thereby, and thereafter transporting one after the other the other number of stored batches to said machine to be formed into packages thereby.

3. In a method for handling lengths of timber which are both green and dried, the steps of conveying both the green timber lengths and dried timber lengths simultaneously along separate respective paths to a given location, conveying the green and dried timber lengths beyond said given location at least in part along a common path with a conveyor having hook-shaped supports for the timber lengths, which conveyor travels over a drop sorter having compartments into which the lengths of timber are dropped from the hook-shaped supports, arranging the green timber lengths and dried timber lengths alternately on successive ones of the hook-shaped supports which travel over the compartments of the drop sorter, dropping green timber lengths from the hook-shaped supports into predetermined compartments of the drop sorter and also dropping dried timber lengths from the hook-shaped supports into other predetermined compartments of the drop sorter, so that any given compartment of the drop sorter will receive only one type of timber length, namely either green timber lengths or dried timber lengths, delivering the green lengths of timber and the dried lengths of timber from the drop sorter to a batch conveyor for conveying batches of sorted green timber and batches of sorted dried timber, and conveying said batches by way of said batch conveyor to a packaging apparatus, said packaging apparatus forming from each batch of green timber a green timber package in which layers of green timber are separated by spacers, preparatory to being delivered to a drying unit, while forming at said apparatus from the dried timber batches packages of dried timber which are suitable for further handling and wherein said packaging apparatus includes one packaging machine for forming from the green timber packages in which layers of green timber are separated by spacers and a second packaging machine in which the dried timber are formed into packages, and conveying from said drop sorter batches of green timber received therefrom to said one packaging machine while conveying from said drop sorter batches of dried timber received therefrom to said second packaging machine.

4. In an apparatus for handling both green and dried timber lengths, green timber conveying means for conveying lengths of green timber to a given location, dried timber conveying means for conveying dried lengths of timber to said given location, common conveying means situated in part at said given location for receiving both green and dried timber lengths at said given location respectively from said green timber conveying means and dried timber conveying means and for conveying both the green and dried timber lengths beyond said given location, said common conveying means including a drop conveyor for conveying the dried and green timber lengths at least in part along a common path and for dropping the timber lengths from the path along which they are conveyed by said drop conveyor, drop-sorting means having compartments situated beneath said drop conveyor for receiving dropped lengths of green and dried timber therefrom, batch conveying means situated beneath said drop-sorting means for receiving batches of green and dried timber therefrom and for conveying said batches away from a location beneath said drop-sorting means, and packaging means cooperating with said batch-conveying means for receiving the batches conveyed thereby and for forming from said batches packages of green timber in which layers of green timber are separated by spacers preparatory to delivering the packages of green timber to a timber-drying installation and for forming packages of dried timber from the dried timber batches said batch conveying means including separate conveyors one of which is a conveyor for batches of green timber and the other of which is a conveyor for batches of dried timber, said drop-sorting means including separate groups of compartments one of which is situated over said one batch conveyor for receiving green timber and delivering batches thereof to said one batch conveyor, and said drop-sorting means including another group of compartments situated over said conveyor for said batches of dried timber for delivering thereto separate batches of dried timber to be conveyed thereby, and said packaging means including a pair of separate packaging machines one of which receives batches of green timber from said one batch conveyor and the other of which receives batches of dried timber from said other batch conveyor.

5. The combination of claim 4 and wherein said one group of compartments of said drop-sorting means includes a series of compartments situated one directly next to the other while the other group of compartments also includes a series of compartments situated next to each other.

6. In an apparatus for handling both green and dried timber lengths, green timber conveying means for conveying lengths of green timber to a given location, dried timber conveying means for conveying dried lengths of timber to said given location, common conveying means situated in part at said given location for receiving both green and dried timber lengths at said given location respectively from said green timber conveying means and dried timber conveying means and for conveying both the green and dried timber lengths beyond said given location, said common conveying means including a drop conveyor for conveying the dried and green timber lengths at least in part along a common path and for dropping the timber lengths from the path along which they are conveyed by said conveyor, drop-sorting means having compartments situated beneath said drop conveyor for receiving dropped lengths of green and dried timber therefrom, batch conveying means situated beneath said drop-sorting means for receiving batches of green and dried timber therefrom and for conveying said batches away from a location beneath said drop-sorting means, and packaging means cooperating with said batch-conveying means for receiving the batches conveyed thereby and for forming from said batches packages of green timber in which layers of green timber are separated by spacers preparatory to delivering the packages of green timber to a timber-drying installation and for forming packages of dried timber from the dried timber batches and wherein said batch conveying means includes separate conveyors for batches of green timber and batches of dried timber, said packaging apparatus being in the form of a single unitary packaging machine for providing both packages from the green timber and packages from the dried timber, and transporting means extending from a location situated between said separate batch conveyors to said unitary packaging machine for transporting the batches of green timber and batches of dried timber received from said separate conveyors to said unitary packaging machine.

7. The combination of claim 6 and wherein said transporting means transports the batches received from said batch conveyors along a path which extends transversely with respect to the path along which the batches are conveyed by said batch conveyors.

8. The combination of claim 7 and wherein said packaging machine includes a conveyor for receiving lengths of timber from said transporting means, and a lift cooperating with the latter conveyor for receiving the lengths of timber therefrom and forming a group of the received lengths of timber into a package, and distributing means cooperating with said lift for distributing thereto spacer sticks to be located between layers of green timber lengths when forming packages therefrom.

9. In an apparatus for handling both green and dried timber lengths, green timber conveying means for conveying lengths of green timber to a given location, dried timber conveying means for conveying dried lengths of timber to said given location, common conveying means situated in part at said given location for receiving both green and dried timber lengths at said given location respectively from said green timber conveying means and dried timber conveying means and for conveying both the green and dried timber lengths beyond said given location, said common conveying means including a drop conveyor for conveying the dried and green timber lengths at least in part along a common path and for dropping the timber lengths from the path along which they are conveyed by said drop conveyor, drop-sorting means having compartments situated beneath said drop conveyor for receiving dropped lengths of green and dried timber therefrom, batch conveying means situated beneath said drop-sorting means for receiving batches of green and dried timber therefrom and for conveying said batches away from a location beneath said drop-sorting means, and packaging means cooperating with said batch-conveying means for receiving the batches conveyed thereby and for forming from said batches packages of green timber in which layers of green timber are separated by spacers preparatory to delivering the packages of green timber to a timber-drying installation and for forming packages of dried timber from the dried timber batches and wherein said batch conveying means includes separate conveyors extending away from each other while having adjoining overlapping ends enabling said separate conveyors to be operated in both directions for transporting batches of timber in either one of a pair of opposite directions for enabling timber batches to be stored prior to being delivered to said packaging means.

10. In an apparatus for handling both green and dried timber lengths, green timber conveying means for conveying lengths of green timber to a given location, dried timber conveying means for conveying dried lengths of timber to said given location, common conveying means situated in part at said given location for receiving both green and dried timber lengths at said given location respectively from said green timber conveying means and dried timber conveying means and for conveying both the green and dried timber lengths beyond said given location, said common conveying means including a drop conveyor for conveying the dried and green timber lengths at least in part along a common path and for dropping the timber lengths from the path along which they are conveyed by said drop conveyor, drop-sorting means having compartments situated beneath said drop conveyor for receiving dropped lengths of green and dried timber therefrom, and wherein said green and dried timber conveying means form a pair of conveying means one of which delivers the timber lengths conveyed thereby to said common conveying means and the other of which thereafter delivers the lengths of timber conveyed thereby to said common conveying means respectively into spaces situated between the timber lengths delivered to said common conveying means by said one conveying means and wherein at the location where said other conveying means delivers timber lengths to said common conveying means there is an inclined member having a surface down which timber from said other conveying means slides to be received in spaces between the lengths of timber received by said conveying means from said one conveying means.

* * * * *